(12) United States Patent
Zheng et al.

(10) Patent No.: US 11,894,786 B2
(45) Date of Patent: Feb. 6, 2024

(54) PERMANENT-MAGNET SYNCHRONOUS MACHINE CONTROL METHOD AND DEVICE, AND PERMANENT-MAGNET SYNCHRONOUS MACHINE CONTROL SYSTEM

(71) Applicant: CONTEMPORARY AMPEREX TECHNOLOGY CO., LIMITED, Ningde (CN)

(72) Inventors: Xiong Zheng, Ningde (CN); Xianxi Pan, Ningde (CN); Yu Luo, Ningde (CN); Zhimin Dan, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/858,864

(22) Filed: Jul. 6, 2022

(65) Prior Publication Data

US 2023/0067971 A1 Mar. 2, 2023

Related U.S. Application Data

(63) Continuation of application No. PCT/CN2021/114792, filed on Aug. 26, 2021.

(51) Int. Cl.
*H02P 21/06* (2016.01)
*H02P 21/05* (2006.01)
(Continued)

(52) U.S. Cl.
CPC ............... *H02P 21/05* (2013.01); *H02P 6/10* (2013.01); *H02P 21/22* (2016.02); *H02P 2207/05* (2013.01)

(58) Field of Classification Search
CPC .. H02P 21/05; H02P 21/22; H02P 6/10; H02P 2207/05; H02P 21/06
See application file for complete search history.

(56) References Cited

U.S. PATENT DOCUMENTS

2006/0132082 A1* 6/2006 Ihm .................... H02P 21/06
318/717

FOREIGN PATENT DOCUMENTS

| CN | 102201770 A | * | 9/2011 |
| CN | 104300541 A | | 1/2015 |

(Continued)

OTHER PUBLICATIONS

International Search Report and Written Opinion, PCT/CN2021/114792, dated May 11, 2022, 8 pgs.—No Translation Available.

(Continued)

*Primary Examiner* — Cortez M Cook
(74) *Attorney, Agent, or Firm* — ANOVA LAW GROUP, PLLC

(57) ABSTRACT

This application provides a permanent-magnet synchronous machine control method and device, and a permanent-magnet synchronous machine control system. The method includes: obtaining a d-axis current $i_d$ and a q-axis current $i_q$ in a permanent-magnet synchronous machine control loop at a current moment; obtaining a fifth-order harmonic current $i_{d5th}$ and a seventh-order harmonic current $i_{d7th}$ in the d-axis current $i_d$ in the permanent-magnet synchronous machine control loop at the current moment, and a fifth-order harmonic current $i_{q5th}$ and a seventh-order harmonic current $i_{q7th}$ in the q-axis current $i_q$ in the permanent-magnet synchronous machine loop at the current moment; determining a d-axis current $i_d^{k+1}$ at a next moment in each switch state; determining a q-axis current $i_q^{k+1}$ at the next moment in each switch state based on the first current $i_d^k$, the second current $i_q^k$, and the second voltage in each switch state; and deter- (Continued)

mining a control policy of the permanent-magnet synchronous machine.

10 Claims, 5 Drawing Sheets

(51) Int. Cl.
*H02P 6/10* (2006.01)
*H02P 21/22* (2016.01)

(56) References Cited

FOREIGN PATENT DOCUMENTS

| | | |
|---|---|---|
| CN | 104579042 A | 4/2015 |
| CN | 106817059 A | 6/2017 |
| CN | 112737441 A | 4/2021 |
| JP | 2015159666 A | 9/2015 |

OTHER PUBLICATIONS

The European Patent Office (EPO), Extended Search Report for EP Application No. 21908081.9, dated Jan. 3, 2023, 7 Pages.

\* cited by examiner

PERMANENT-MAGNET SYNCHRONOUS MACHINE CONTROL METHOD AND DEVICE, AND PERMANENT-MAGNET SYNCHRONOUS MACHINE CONTROL SYSTEM

CROSS-REFERENCE TO RELATED APPLICATIONS

This application is a continuation application of PCT Patent Application No. PCT/CN2021/114792, filed on Aug. 26, 2021, which is incorporated herein by reference in its entirety.

TECHNICAL FIELD

This application relates to the technical field of electric machine control, and in particular, to a permanent-magnet synchronous machine control method and device, and a permanent-magnet synchronous machine control system.

BACKGROUND

As a high-performance drive motor or generator, permanent-magnet synchronous machines are widely used in the fields such as new-energy electric vehicles, wind power generation, and ship turbine propulsion currently.
However, torque ripples always exist in a control process of the permanent-magnet synchronous machine (such as a built-in permanent-magnet synchronous machine), and drastically affect the use of the electric machine on an occasion that requires high-precision control. Reasons for the occurrence of the torque ripples partly lie in a harmonic torque brought by a dead time and a non-linear characteristic of an inverter. With such harmonic components being mixed with fundamental current components, the permanent-magnet synchronous machine incurs greater iron loss and copper loss, thereby drastically affecting normal drive control efficiency, and also increasing the possibility of current overshoot and runaway and bringing safety hazards. This bottlenecks the application scope of the permanent-magnet synchronous machine.

In order to eliminate the harmonic torque, harmonic current components during the operation of the electric machine need to be extracted first. However, the harmonic current suppression method currently available needs participation of a large number of proportional integral (PI) controllers, and the entire suppression process involves complicated PI parameter adjustment. Because a large number of PI controllers are integrated, the complexity of the entire control system is relatively high.

SUMMARY

An objective of embodiments of this application is to provide a permanent-magnet synchronous machine control method and device, and a permanent-magnet synchronous machine control system to simplify the complexity of the control system and avoid a complicated parameter adjustment process brought by a large number of PI controllers.

This application is implemented in the following way:
According to a first aspect, an embodiment of this application provides a permanent-magnet synchronous machine control method, including: obtaining a d-axis current $i_d$ and a q-axis current $i_q$ in a permanent-magnet synchronous machine control loop at a current moment; obtaining a fifth-order harmonic current $i_{d5th}$ and a seventh-order harmonic current $i_{d7th}$ in the d-axis current $i_d$ in the permanent-magnet synchronous machine control loop at the current moment, and a fifth-order harmonic current $i_{q5th}$ and a seventh-order harmonic current $i_{q7th}$ in the q-axis current $i_q$ in the permanent-magnet synchronous machine loop at the current moment; calculating four harmonic voltages based on the fifth-order harmonic current $i_{d5th}$, the seventh-order harmonic current $i_{d7th}$, the fifth-order harmonic current $i_{q5th}$, and the seventh-order harmonic current $i_{q7th}$, where the four harmonic voltages include a d-axis fifth-order harmonic voltage $u_{d5th}$, a q-axis fifth-order harmonic voltage $u_{q5th}$, a d-axis seventh-order harmonic voltage $u_{d7th}$, and a q-axis seventh-order harmonic voltage $u_{q7th}$; subtracting the fifth-order harmonic current $i_{d5th}$ and the seventh-order harmonic current $i_{d7th}$ from the d-axis current $i_d$ to obtain a first current $i_d^k$ on a d axis; and subtracting the fifth-order harmonic current $i_{q5th}$ and the seventh-order harmonic current $i_{q7th}$ from the q-axis current $i_q$ to obtain a second current $i_q^k$ on a q axis; subtracting the d-axis fifth-order harmonic voltage $u_{d5th}$ and the d-axis seventh-order harmonic voltage $u_{d7th}$ from a d-axis voltage corresponding to each switch state of the inverter to obtain a first voltage on the d axis in each switch state, and subtracting the q-axis fifth-order harmonic voltage $u_{q5th}$ and the q-axis seventh-order harmonic voltage $u_{q7th}$ from a q-axis voltage corresponding to each switch state of the inverter to obtain a second voltage on the q axis in each switch state; determining a d-axis current $i_d^{k+1}$ at a next moment in each switch state based on the first current $i_d^k$, the second current $i_q^k$, and the first voltage in each switch state; and determining a q-axis current $i_q^{k+1}$ at the next moment in each switch state based on the first current $i_d^k$, the second current $i_q^k$, and the second voltage in each switch state; and determining a control policy of the permanent-magnet synchronous machine based on the d-axis current $i_d^{k+1}$ at the next moment in each switch state and the q-axis current $i_q^{k+1}$ at the next moment in each switch state.

Based on a model predictive control algorithm, the permanent-magnet synchronous machine control method according to this embodiment of this application predicts the corresponding d-axis current and q-axis current at the next moment in each switch state with reference to the d-axis current and q-axis current net of the harmonic components at the current moment, and then determines the control policy of the permanent-magnet synchronous machine based on the prediction result. Compared with the existing harmonic current suppression method, the technical solution in this application cancels the existing PI controllers by using the model predictive control algorithm instead, avoids complicated PI parameter adjustment, simplifies the system structure, and is more effective in suppressing the harmonic current.

With reference to the technical solution according to the first aspect, in some possible implementations, the obtaining a fifth-order harmonic current $i_{d5th}$ and a seventh-order harmonic current $i_{d7th}$ in the d-axis current $i_d$ in the permanent-magnet synchronous machine control loop at the current moment, and a fifth-order harmonic current $i_{q5th}$ and a seventh-order harmonic current $i_{q7th}$ in the q-axis current $i_q$ in the permanent-magnet synchronous machine loop at the current moment includes: obtaining a three-phase current in the permanent-magnet synchronous machine control loop at the current moment; transforming the three-phase current into a d-axis current and a q-axis current in a fifth-order rotating coordinate system based on a coordinate transformation algorithm and a phase angle of a fifth-order harmonic; filtering the d-axis current and the q-axis current in the fifth-order rotating coordinate system by using a filter, so as to obtain the fifth-order harmonic current $i_{d5th}$ and the fifth-order harmonic current $i_{q5th}$; transforming the three-phase current into a d-axis current and a q-axis current in a seventh-order rotating coordinate system based on the coordinate transformation algorithm and a phase angle of a seventh-order harmonic; and filtering the d-axis current and the q-axis current in the seventh-order rotating coordinate system by using the filter, so as to obtain the seventh-order harmonic current $i_{d7th}$ and the seventh-order harmonic current $i_{q7th}$.

With reference to the technical solution according to the first aspect, in some possible implementations, a formula for calculating the d-axis fifth-order harmonic voltage $u_{d5th}$ is: $u_{d5th}=5w_eL_qi_{q5th}+R_si_{d5th}$; a formula for calculating the q-axis fifth-order harmonic voltage $u_{q5th}$ is: $u_{q5th}=-5w_eL_di_{d5th}+R_si_{q5th}$; a formula for calculating the d-axis seventh-order harmonic voltage $u_{d7th}$ is: $u_{d7th}=-7w_eL_qi_{q7th}+R_si_{d7th}$; and a formula for calculating the q-axis seventh-order harmonic voltage $u_{q7th}$ is: $u_{q7th}=7w_eL_di_{d7th}+R_si_{q7th}$, where, $w_e$ represents an electrical angular velocity, $R_s$ represents a stator resistance, $L_d$ represents a d-axis inductance parameter, and $L_q$ represents a q-axis inductance parameter.

With reference to the technical solution according to the first aspect, in some possible implementations, the determining a control policy of the permanent-magnet synchronous machine based on the d-axis current $i_d^{k+1}$ at the next moment in each switch state and the q-axis current $i_q^{k+1}$ at the next moment in each switch state includes: obtaining a d-axis reference current $i_d^{ref}$ and a q-axis reference current $i_q^{ref}$ based on an MTPA and a torque current distribution policy of flux weakening control; and calculating a cost function corresponding to each switch state based on the d-axis current $i_d^{k+1}$ at the next moment in each switch state, the q-axis current $i_q^{k+1}$ at the next moment in each switch state, the d-axis reference current $i_d^{ref}$, and the q-axis reference current $i_q^{ref}$. A switch state with a lowest cost function is the control policy of the permanent-magnet synchronous machine.

The permanent-magnet synchronous machine control method according to this embodiment of this application adopts the idea of a finite set, calculates the cost function corresponding to each switch state based on a voltage vector of the switch state of the inverter, and determines an optimal switch state based on the cost function. In this way, a modem in vector control is eliminated, the control structure of the system is further simplified, and dynamic response of the system is improved by directly outputting an optimal switch vector.

With reference to the technical solution according to the first aspect, in some possible implementations, the inverter is a two-level inverter, and the two-level inverter includes eight switch states.

According to a second aspect, an embodiment of this application provides a permanent-magnet synchronous machine control device, including: a first obtaining module, configured to obtain a d-axis current $i_d$ and a q-axis current $i_q$ in a permanent-magnet synchronous machine control loop at a current moment; a second obtaining module, configured to obtain a fifth-order harmonic current $i_{d5th}$ and a seventh-order harmonic current $i_{d7th}$ in the d-axis current $i_d$ in the permanent-magnet synchronous machine control loop at the current moment, and a fifth-order harmonic current $i_{q5th}$ and a seventh-order harmonic current $i_{q7th}$ in the q-axis current $i_q$ in the permanent-magnet synchronous machine control loop at the current moment; a first calculation module, configured to calculate four harmonic voltages based on the fifth-order harmonic current $i_{d5th}$, the seventh-order harmonic current $i_{d7th}$, the fifth-order harmonic current $i_{q5th}$, and the seventh-order harmonic current $i_{q7th}$, where the four harmonic voltages include a d-axis fifth-order harmonic voltage $u_{d5th}$, a q-axis fifth-order harmonic voltage $u_{q5th}$, a d-axis seventh-order harmonic voltage $u_{d7th}$, and a q-axis seventh-order harmonic voltage $u_{q7th}$; a second calculation module, configured to subtract the fifth-order harmonic current $i_{d5th}$ and the seventh-order harmonic current $i_{d7th}$ from the d-axis current $i_d$ to obtain a first current $i_d^k$ on a d axis, and subtract the fifth-order harmonic current $i_{q5th}$ and the seventh-order harmonic current $i_{q7th}$ from the q-axis current $i_q$ to obtain a second current $i_q^k$ on a q axis; a third calculation module, configured to subtract the d-axis fifth-order harmonic voltage $u_{d5th}$ and the d-axis seventh-order harmonic voltage $u_{d7th}$ from a d-axis voltage corresponding to each switch state of the inverter to obtain a first voltage on the d axis in each switch state, and subtract the q-axis fifth-order harmonic voltage $u_{q5th}$ and the q-axis seventh-order harmonic voltage $u_{q7th}$ from a q-axis voltage corresponding to each switch state of the inverter to obtain a second voltage on the q axis in each switch state; a fourth calculation module, configured to determine a d-axis current $i_d^{k+1}$ at a next moment in each switch state based on the first current $i_d^k$, the second current $i_q^k$, and the first voltage in each switch state; and determine a q-axis current $i_q^{k+1}$ at the next moment in each switch state based on the first current $i_d^k$, the second current $i_q^k$, and the second voltage in each switch state; and a determining module, configured to determine a control policy of the permanent-magnet synchronous machine based on the d-axis current $i_d^{k+1}$ at the next moment in each switch state and the q-axis current $i_q^{k+1}$ at the next moment in each switch state.

With reference to the technical solution according to the second aspect, in some possible implementations, the second obtaining module is specifically configured to obtain a three-phase current in the permanent-magnet synchronous machine control loop at the current moment; transform the three-phase current into a d-axis current and a q-axis current in a fifth-order rotating coordinate system based on a coordinate transformation algorithm and a phase angle of a fifth-order harmonic; filter the d-axis current and the q-axis current in the fifth-order rotating coordinate system by using a filter, so as to obtain the fifth-order harmonic current $i_{d5th}$ and the fifth-order harmonic current $i_{q5th}$; transform the three-phase current into a d-axis current and a q-axis current in a seventh-order rotating coordinate system based on the coordinate transformation algorithm and a phase angle of a seventh-order harmonic; and filter the d-axis current and the q-axis current in the seventh-order rotating coordinate system by using the filter, so as to obtain the seventh-order harmonic current $i_{d7th}$ and the seventh-order harmonic current $i_{q7th}$.

With reference to the technical solution according to the second aspect, in some possible implementations, a formula for calculating the d-axis fifth-order harmonic voltage $u_{d5th}$ is: $u_{d5th}=5w_eL_qi_{q5th}+R_si_{d5th}$; a formula for calculating the q-axis fifth-order harmonic voltage $u_{q5th}$ is: $u_{q5th}=-5w_eL_di_{d5th}+R_si_{q5th}$; a formula for calculating the d-axis seventh-order harmonic voltage $u_{d7th}$ is: $u_{d7th}=-7w_eL_qi_{q7th}+R_si_{d7th}$; and a formula for calculating the q-axis seventh-order harmonic voltage $u_{q7th}$ is: $u_{q7th}=7w_eL_di_{d7th}+R_si_{q7th}$, where, $w_e$ represents an electrical angular velocity, $R_s$ represents a stator resistance, $L_d$ represents a d-axis inductance parameter, and $L_q$ represents a q-axis inductance parameter.

With reference to the technical solution according to the second aspect, in some possible implementations, the determining module is specifically configured to obtain a d-axis reference current $i_d^{ref}$ and a q-axis reference current $i_q^{ref}$ based on an MTPA and a torque current distribution policy of flux weakening control; and calculate a cost function corresponding to each switch state based on the d-axis current $i_d^{k+1}$ at the next moment in each switch state, the q-axis current $i_q^{k+1}$ at the next moment in each switch state, the d-axis reference current $i_d^{ref}$, and the q-axis reference current $i_q^{ref}$. A switch state with a lowest cost function is the control policy of the permanent-magnet synchronous machine.

According to a third aspect, an embodiment of this application provides a permanent-magnet synchronous machine control system, including: an electric machine controller, a permanent-magnet synchronous machine, and an inverter. The electric machine controller is connected to the permanent-magnet synchronous machine and the inverter separately. The permanent-magnet synchronous machine is further connected to the inverter. The electric machine controller is configured to perform the method according to the embodiment of the first aspect and/or with reference to some possible implementations of the embodiment of the first aspect.

According to a fourth aspect, an embodiment of this application provides a computer-readable storage medium on which a computer program is stored. When executed by a processor, the computer program implements the method according to the embodiment of the first aspect and/or with reference to some possible implementations of the embodiment of the first aspect.

BRIEF DESCRIPTION OF DRAWINGS

To describe technical solutions in embodiments of this application more clearly, the following outlines the drawings to be used in the embodiments of this application. Understandably, the following drawings show merely some embodiments of this application, and therefore, are not intended to limit the scope. A person of ordinary skill in the art may derive other related drawings from the drawings without making any creative efforts.

Figure 1:
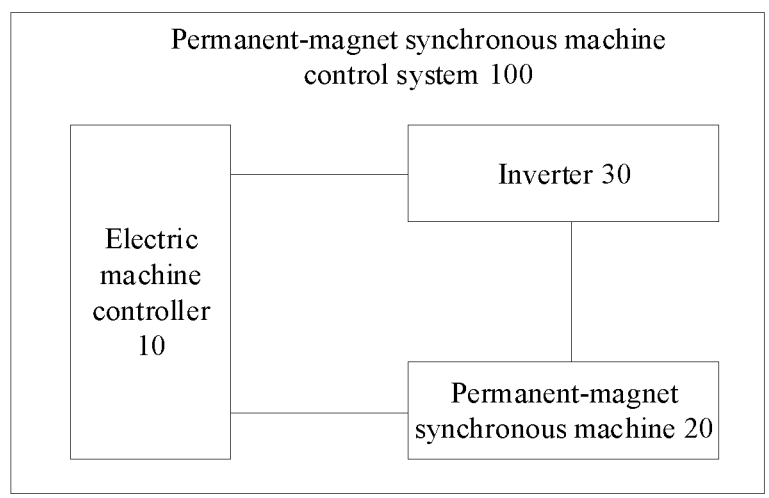
FIG. 1 is a modular block diagram of a permanent-magnet synchronous machine control system according to an embodiment of this application.

Reference numerals: 100—permanent-magnet synchronous machine control system; 10—electric machine controller; 20—permanent-magnet synchronous machine; 30—inverter; 200—permanent-magnet synchronous machine control device; 201—first obtaining module; 202—second obtaining module; 203—first calculation module; 204—second calculation module; 205—third calculation module; 206—fourth calculation module; and 207—determining module.

DETAILED DESCRIPTION OF EMBODIMENTS

The following describes technical solutions in embodiments of this application with reference to the drawings in the embodiments of this application.

Referring to FIG. 1, an embodiment of this application provides a permanent-magnet synchronous machine control system 100, including: an electric machine controller 10, a permanent-magnet synchronous machine 20, and an inverter 30.

The electric machine controller 10 is connected to the permanent-magnet synchronous machine 20 and the inverter 30 separately. The permanent-magnet synchronous electric machine 20 is further connected to the inverter 30.

It needs to be noted that the inverter 30 is a transformer that transforms direct-current electrical energy into a constant-frequency constant-voltage or frequency-regulated voltage-regulated alternating current. The electric machine controller 10 may be an integrated circuit chip capable of signal processing. Alternatively, the electric machine controller 10 may be a general-purpose processor, and may be, for example, a digital signal processor (DSP), an application specific integrated circuit (ASIC), a discrete gate or a transistor logic device, or a discrete hardware component, and can implement or perform the methods, steps, and logical block diagrams disclosed in the embodiments of this application. In addition, the general-purpose processor may be a microprocessor, or any conventional processor or the like.

In this embodiment of this application, the electric machine controller 10 controls the permanent-magnet synchronous machine 20 by controlling the inverter 30.

Figure 2A:
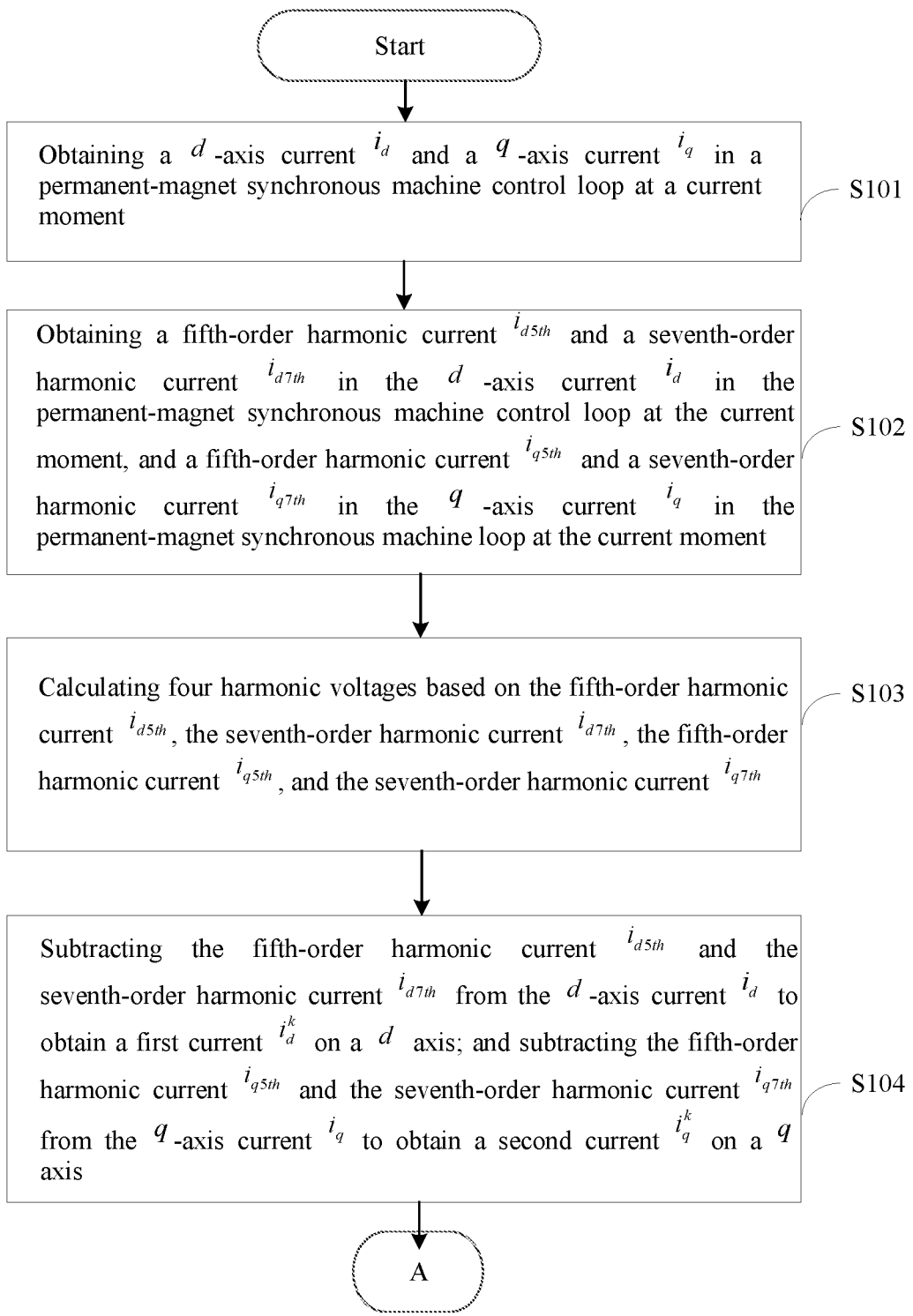
FIG. 2A and FIG. 2B is a flowchart of steps of a permanent-magnet synchronous machine control method according to an embodiment of this application.
Figure 2B:
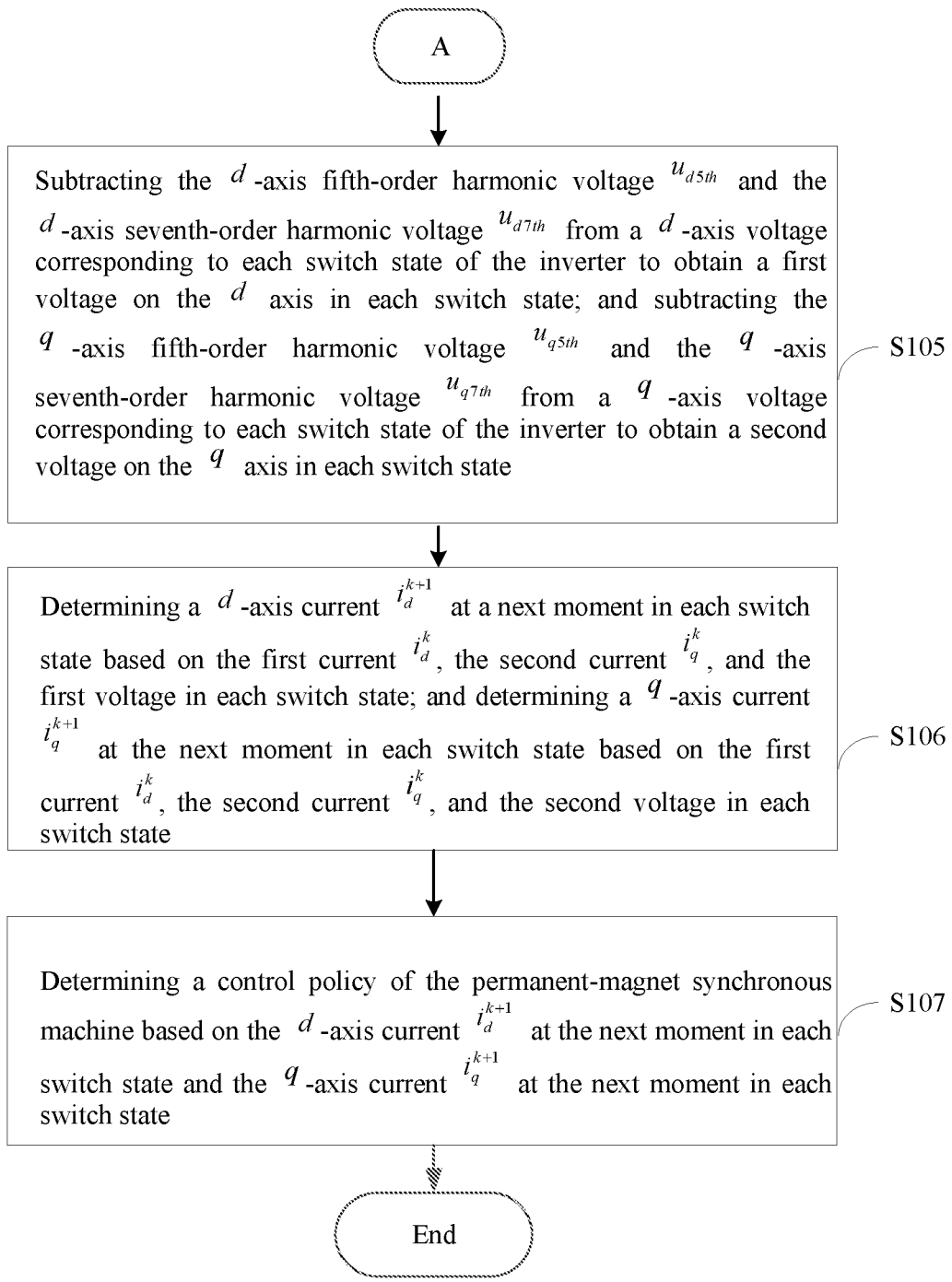

Referring to FIG. 2, FIG. 2 is a flowchart of steps of a permanent-magnet synchronous machine control method according to an embodiment of this application. The method is applied to the electric machine controller 10 in the permanent-magnet synchronous machine control system 100 shown in FIG. 1. It needs to be noted that the permanent-magnet synchronous machine control method according to this embodiment of this application is not limited to the order shown in FIG. 2 or the order described below. The method includes steps S101 to S107.

Step S101: Obtaining a d-axis current $i_d$ and a q-axis current $i_q$ in a permanent-magnet synchronous machine control loop at a current moment.

When the electric machine controller is directly connected to the permanent-magnet synchronous machine, the electric machine controller is configured to obtain a three-phase current in the permanent-magnet synchronous machine control loop at the current moment, and then perform current transformation based on a coordinate transformation algorithm to obtain the d-axis current $i_d$ and the q-axis current $i_q$ in the permanent-magnet synchronous machine control loop at the current moment.

The coordinate transformation algorithm is used to transform the three-phase current into the dq-axis current. Such coordinate transformation algorithm is well known in the art, and is not detailed in this application.

In addition, the transformation process may be performed by a discrete control chip. For example, a control chip is disposed in the permanent-magnet synchronous machine control system, and is connected between the electric machine controller and the permanent-magnet synchronous machine. The control chip is configured to obtain a three-phase current in the permanent-magnet synchronous machine control loop at the current moment, and then perform current transformation based on the coordinate transformation algorithm to obtain the d-axis current $i_d$ and the q-axis current $i_q$ in the permanent-magnet synchronous machine control loop at the current moment. Then the control chip transmits the d-axis current $i_d$ and the q-axis current $i_q$ in the permanent-magnet synchronous machine control loop at the current moment to the electric machine controller, so that the electric machine controller obtains the d-axis current $i_d$ and the q-axis current $i_q$ in the permanent-magnet synchronous machine control loop at the current moment.

Step S102: Obtaining a fifth-order harmonic current $i_{d5th}$ and a seventh-order harmonic current $i_{d7th}$ in the d-axis current $i_d$ in the permanent-magnet synchronous machine control loop at the current moment, and a fifth-order harmonic current $i_{q5th}$ and a seventh-order harmonic current $i_{q7th}$ in the q-axis current $i_q$ in the permanent-magnet synchronous machine loop at the current moment.

Harmonic currents existent in the permanent-magnet synchronous machine are primarily the fifth-order harmonic current and the seventh-order harmonic current. Therefore, it is necessary to extract the fifth-order harmonic current $i_{d5th}$ and the seventh-order harmonic current $i_{d7th}$ in the d-axis current $i_d$ in the permanent-magnet synchronous machine control loop at the current moment and the fifth-order harmonic current $i_{q5th}$ and the seventh-order harmonic current $i_{q7th}$ in the q-axis current $i_q$ in the permanent-magnet synchronous machine loop at the current moment.

Specifically, this step includes: obtaining a three-phase current in the permanent-magnet synchronous machine control loop at the current moment; transforming the three-phase current into a d-axis current and a q-axis current in a fifth-order rotating coordinate system based on a coordinate transformation algorithm and a phase angle of a fifth-order harmonic; filtering the d-axis current and the q-axis current in the fifth-order rotating coordinate system by using a filter, so as to obtain the fifth-order harmonic current $i_{d5th}$ and the fifth-order harmonic current $i_{q5th}$; transforming the three-phase current into a d-axis current and a q-axis current in a seventh-order rotating coordinate system based on the coordinate transformation algorithm and a phase angle of a seventh-order harmonic; and filtering the d-axis current and the q-axis current in the seventh-order rotating coordinate system by using the filter, so as to obtain the seventh-order harmonic current $i_{d7th}$ and the seventh-order harmonic current $i_{q7th}$.

It needs to be noted that the harmonic currents extracted from the d axis and the q axis are a current in a fifth-order rotating coordinate system and a current in a seventh-order rotating coordinate system respectively. For example, both the fifth-order harmonic current extracted from the d-axis current and the fifth-order harmonic current extracted from the q-axis current are currents in the fifth-order rotating coordinate system, and both the seventh-order harmonic current extracted from the d-axis current and the seventh-order harmonic current extracted from the q-axis current are currents in the seventh-order rotating coordinate system. To facilitate unified calculation, the currents in the fifth-order rotating coordinate system and the seventh-order rotating coordinate system are uniformly transformed for use in a first-order synchronous rotating coordinate system identical with the d-axis current $i_d$ and the q-axis current $i_q$, so as to obtain the fifth-order harmonic current $i_{d5th}$, the fifth-order harmonic current $i_{q5th}$, the seventh-order harmonic current $i_{d7th}$, and the seventh-order harmonic current $i_{q7th}$ that are transformed for use in the first-order synchronous rotating coordinate system.

The coordinate transformation may be Park transformation, which is well known in the art, and is not described in detail here.

Step S103: Calculating four harmonic voltages based on the fifth-order harmonic current $i_{d5th}$, the seventh-order harmonic current $i_{d7th}$, the fifth-order harmonic current $i_{q5th}$, and the seventh-order harmonic current $i_{q7th}$.

The four harmonic voltages include a d-axis fifth-order harmonic voltage $u_{d5th}$, a q-axis fifth-order harmonic voltage $u_{q5th}$, a d-axis seventh-order harmonic voltage $u_{d7th}$, and a q-axis seventh-order harmonic voltage $u_{q7th}$.

A formula for calculating the d-axis fifth-order harmonic voltage $u_{d5th}$ is:

$$u_{d5th} = 5w_e L_q i_{q5th} + R_s i_{d5th} \tag{1}$$

A formula for calculating the q-axis fifth-order harmonic voltage $u_{q5th}$ is:

$$u_{q5th} = -5w_e L_d i_{d5th} + R_s i_{q5th} \tag{2}$$

A formula for calculating the d-axis seventh-order harmonic voltage $u_{d7th}$ is:

$$u_{d7th} = -7w_e L_q i_{q7th} + R_s i_{d7th} \tag{3}$$

A formula for calculating the q-axis seventh-order harmonic voltage $u_{q7th}$ is:

$$u_{q7th} = 7w_e L_d i_{d7th} + R_s i_{q7th} \tag{4}$$

In formulas (1) to (4), $w_e$ represents an electrical angular velocity, $R_s$ represents a stator resistance, $L_d$ represents a d-axis inductance parameter, and $L_q$ represents a q-axis inductance parameter.

Step S104: Subtracting the fifth-order harmonic current $i_{d5th}$ and the seventh-order harmonic current $i_{d7th}$ from the d-axis current $i_d$ to obtain a first current $i_d^k$ on a d axis; and subtracting the fifth-order harmonic current $i_{q5th}$ and the seventh-order harmonic current $i_{q7th}$ from the q-axis current $i_q$ to obtain a second current $i_q^k$ on a q axis.

The d-axis current $i_d$ and the q-axis current $i_q$ each include harmonic components (fifth-order harmonic current and seventh-order harmonic current). Therefore, the harmonic components are removed to obtain a current net of the harmonic components.

Step S105: Subtracting the d-axis fifth-order harmonic voltage $u_{d5th}$ and the d-axis seventh-order harmonic voltage $u_{d7th}$ from a d-axis voltage corresponding to each switch state of the inverter to obtain a first voltage on the d axis in each switch state; and subtracting the q-axis fifth-order harmonic voltage $u_{q5th}$ and the q-axis seventh-order harmonic voltage $u_{q7th}$ from a q-axis voltage corresponding to each switch state of the inverter to obtain a second voltage on the q axis in each switch state.

The expression for the first voltage is:

$$u_d^k = u_d^{k*} - u_{d5th} - u_{d7th} \tag{5}$$

In formula (5), $u_d^{k*}$ represents the d-axis voltage in any switch state, and $u_d^k$ represents the first voltage corresponding to $u_d^{k*}$. It needs to be noted that the first voltage on the d axis in each switch state can be obtained through formula (5).

The expression for the second voltage is:

$$u_q^k = u_q^{k*} - u_{q5th} - u_{q7th} \tag{6}$$

In formula (6), $u_q^{k*}$ represents the q-axis voltage in any switch state, and $u_q^k$ represents the second voltage corresponding to $u_q^{k*}$. It needs to be noted that the second voltage on the q axis in each switch state can be obtained through formula (6).

Step S106: Determining a d-axis current $i_d^{k+1}$ at a next moment in each switch state based on the first current $i_d^k$, the second current $i_q^k$, and the first voltage in each switch state; and determining a q-axis current $i_q^{k+1}$ at the next moment in each switch state based on the first current $i_d^k$, the second current $i_q^k$, and the second voltage in each switch state.

In this embodiment of this application, the current at the next moment in each switch state is predicted based on the current net of the harmonic components at the current moment and the voltage net of the harmonic components in each switch state.

The expression for the d-axis current $i_d^{k+1}$ at the next moment in each switch state is:

$$i_d^{k+1} = \left(1 - \frac{R_s T_s}{L_d}\right)i_d^k + w_e \frac{L_q T_s}{L_d} i_q^k + \frac{T_s}{L_d} u_d^k \quad (7)$$

In formula (7), $u_d^k$ represents the first voltage in any switch state. For ease of calculation, the first voltage has been pre-transformed into a voltage in a first-order synchronous rotating coordinate system. $i_d^{k+1}$ represents the d-axis current at the next moment in a switch state corresponding to $u_d^k$. $R_s$ represents a stator resistance; $L_d$ represents a d-axis inductance parameter; $T_s$ represents sampling time; $L_q$ represents a q-axis inductance parameter; $\psi_f$ represents a flux linkage; and $w_e$ represents an electrical angular velocity.

The expression for the q-axis current $i_q^{k+1}$ at the next moment in each switch state is:

$$i_q^{k+1} = -w_e \frac{L_d T_s}{L_q} i_d^k + \left(1 - \frac{R_s T_s}{L_d}\right)i_q^k + \frac{T_s}{L_d} u_q^k - w_e \frac{\psi_f}{L_q} T_s \quad (8)$$

In formula (8), $u_q^k$ represents the second voltage in any switch state. For ease of calculation, the second voltage has been pre-transformed into a voltage in a first-order synchronous rotating coordinate system. $i_q^{k+1}$ represents the q-axis current at the next moment in a switch state corresponding to $u_q^k$. $R_s$ represents the stator resistance; $L_d$ represents the d-axis inductance parameter; $T_s$ represents sampling time; $L_q$ represents the q-axis inductance parameter; $\psi_f$ represents a flux linkage; and $w_e$ represents the electrical angular velocity.

Step S107: Determining a control policy of the permanent-magnet synchronous machine based on the d-axis current $i_d^{k+1}$ at the next moment in each switch state and the q-axis current $i_q^{k+1}$ at the next moment in each switch state.

After the d-axis current $i_d^{k+1}$ and the q-axis current $i_q^{k+1}$ at the next moment in each switch state are predicted, the control policy of the permanent-magnet synchronous machine can be determined based on the prediction result.

The foregoing step may specifically include: obtaining a d-axis reference current $i_d^{ref}$ and a q-axis reference current $i_q^{ref}$ based on a maximum torque per ampere (MTPA) and a torque current distribution policy of flux weakening control; and calculating a cost function corresponding to each switch state based on the d-axis current $i_d^{k+1}$ at the next moment in each switch state, the q-axis current $i_q^{k+1}$ at the next moment in each switch state, the d-axis reference current $i_d^{ref}$, and the q-axis reference current $i_q^{ref}$. A switch state with a lowest cost function is the control policy of the permanent-magnet synchronous machine.

It needs to be noted that the MTPA and the torque current distribution policy of flux weakening control are control policies well known in the art, and therefore, are not described in detail in this application. In this embodiment of this application, the MTPA and the torque current distribution policy of flux weakening control are intended to provide reference currents (including the d-axis reference current $i_d^{ref}$ and the q-axis reference current $i_q^{ref}$) to facilitate calculation of the cost function.

In an implementation, the expression for the cost function is:

$$g = \sqrt{(i_d^{k+1} - i_d^{ref})^2 + (i_q^{k+1} - i_q^{ref})^2} \quad (9)$$

In formula (9), represents a calculated value of the cost function, $i_d^{k+1}$ represents the d-axis current at the next moment in a switch state, and $i_q^{k+1}$ represents the q-axis current at the next moment in said switch state.

The cost function corresponding to each switch state can be obtained through formula (9), and then the switch state with a lowest calculated value of the cost function serves as the control policy of the permanent-magnet synchronous machine. That is, the permanent-magnet synchronous machine is controlled by using a switch corresponding to the switch state with the lowest calculated value of the cost function.

Evidently, the permanent-magnet synchronous machine control method according to this embodiment of this application adopts the idea of a finite set, calculates the cost function corresponding to each switch state based on a voltage vector of the switch state of the inverter, and determines an optimal switch state based on the cost function. In this way, a modem in vector control is eliminated, the control structure of the system is further simplified, and dynamic response of the system is improved by directly outputting an optimal switch vector.

In this embodiment of this application, the inverter is a two-level inverter. The two-level inverter includes eight switch states, and the eight switch states correspond to seven voltage vectors.

When the inverter is a two-level inverter, an optimal switch state can be determined from the eight switch states in the way above to control the permanent-magnet synchronous machine.

For ease of understanding this solution, the permanent-magnet synchronous machine control method is described below with reference to a control block diagram of a permanent-magnet synchronous machine control system shown in FIG. 3.

First, the electric machine controller is configured to obtain a three-phase current (including $i_a$, $i_b$, and $i_c$) in the permanent-magnet synchronous machine control loop at the current moment, and then perform current transformation based on the coordinate transformation algorithm to obtain the d-axis current $i_d$ and the q-axis current $i_q$ in the permanent-magnet synchronous machine control loop at the current moment.

Harmonic currents existent in the permanent-magnet synchronous machine are primarily the fifth-order harmonic current and the seventh-order harmonic current. Therefore, a harmonic current calculation module shown in FIG. 3 extracts the fifth-order harmonic current $i_{d5th}$ and the seventh-order harmonic current $i_{d7th}$ in the d-axis current $i_d$ in the permanent-magnet synchronous machine control loop at the current moment and the fifth-order harmonic current $i_{q5th}$ and the seventh-order harmonic current $i_{q7th}$ in the q-axis current $i_q$ in the permanent-magnet synchronous machine loop at the current moment. The harmonic current extraction steps shown in FIG. 3 include: transforming the three-phase current (including $i_a$, $i_b$, and $i_c$) into a d-axis current and a q-axis current in a fifth-order rotating coordinate system based on a coordinate transformation algorithm and a phase angle of a fifth-order harmonic; filtering the d-axis current and the q-axis current in the fifth-order rotating coordinate system by using a filter, so as to obtain the fifth-order harmonic current $i_{d5th}$ and the fifth-order harmonic current $i_{q5th}$; transforming the three-phase current into a d-axis current and a q-axis current in a seventh-order rotating coordinate system based on the coordinate transformation algorithm and a phase angle of a seventh-order harmonic; and filtering the d-axis current and the q-axis current in the seventh-order rotating coordinate system by using the filter, so as to obtain the seventh-order harmonic current $i_{d7th}$ and the seventh-order harmonic current $i_{q7th}$. In the drawing, $\theta_r$ represents the phase angle. The phase angle of the fifth-order harmonic $\theta_r$ is $-5\theta$, and the phase angle $\theta_r$ of the seventh-order harmonic is $7\theta$.

Figure 3:
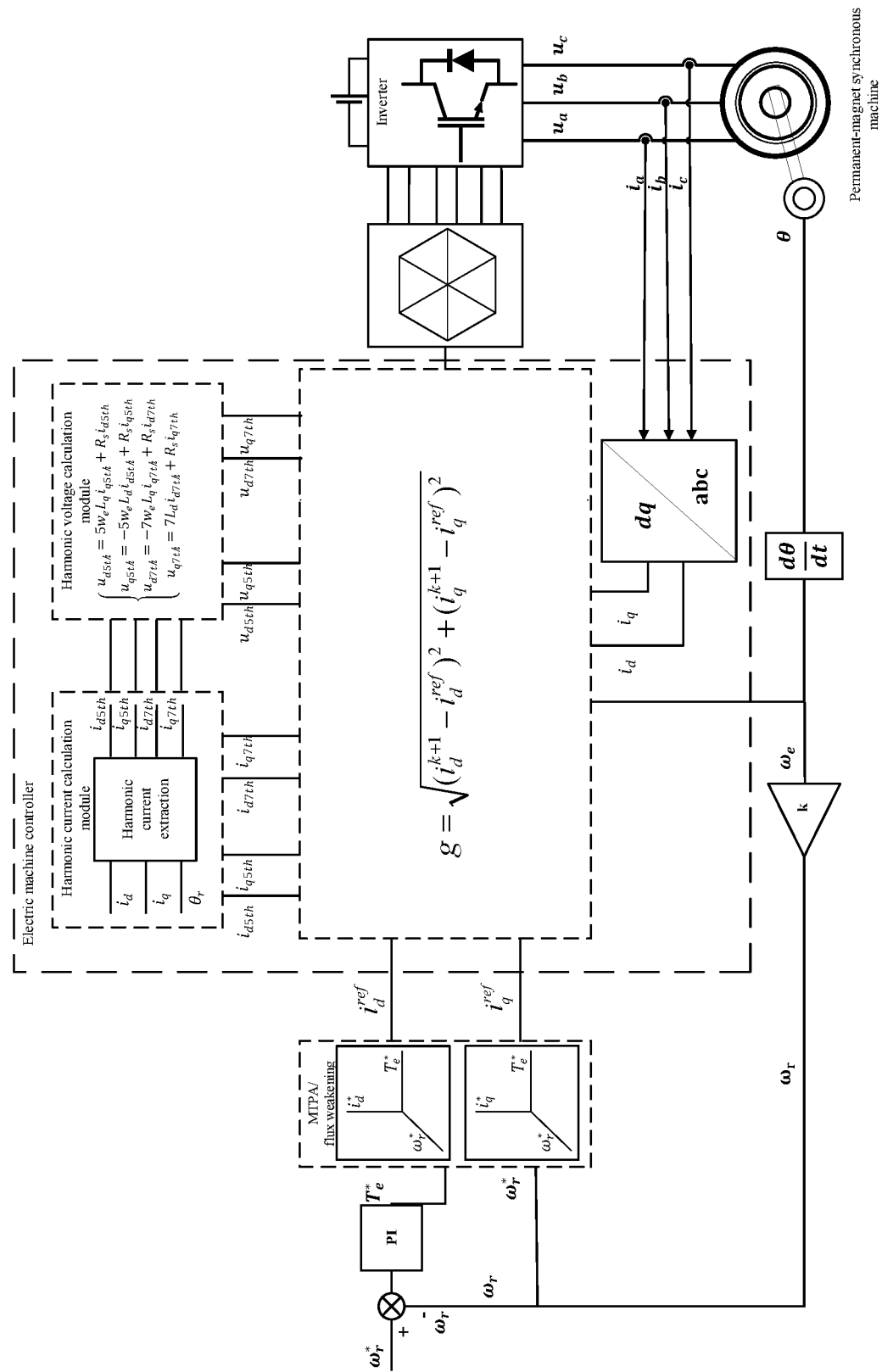
FIG. 3 is a control block diagram of a permanent-magnet synchronous machine control system according to an embodiment of this application.

Then a harmonic voltage calculation module shown in FIG. 3 calculates the d-axis fifth-order harmonic voltage $u_{d5th}$, the q-axis fifth-order harmonic voltage $u_{q5th}$, the d-axis seventh-order harmonic voltage $u_{d7th}$, and the q-axis seventh-order harmonic voltage $u_{q7th}$.

Subsequently, the fifth-order harmonic current $i_{d5th}$ and the seventh-order harmonic current $i_{d7th}$ are subtracted from the d-axis current $i_d$ to obtain a first current $i_d^k$ on a d axis. The fifth-order harmonic current $i_{q5th}$ and the seventh-order harmonic current $i_{q7th}$ are subtracted from the q-axis current $i_q$ to obtain a second current $i_q^k$ on a q axis. Then the d-axis fifth-order harmonic voltage $u_{d5th}$ and the d-axis seventh-order harmonic voltage $u_{d7th}$ are subtracted from a d-axis voltage corresponding to each switch state of the inverter to obtain a first voltage on the d axis in each switch state. The q-axis fifth-order harmonic voltage $u_{q5th}$ and the q-axis seventh-order harmonic voltage $u_{q7th}$ are subtracted from a q-axis voltage corresponding to each switch state of the inverter to obtain a second voltage on the q axis in each switch state. Subsequently, a d-axis current $i_d^{k+1}$ at the next moment in each switch state is determined based on the first current $i_d^k$ and the first voltage in each switch state; and a q-axis current $i_q^{k+1}$ at the next moment in each switch state is determined based on the second current $i_q^k$ and the second voltage in each switch state.

Finally, a d-axis reference current $i_d^{ref}$ and a q-axis reference current $i_q^{ref}$ are obtained based on an MTPA and a torque current distribution policy of flux weakening control. A cost function $g=\sqrt{(i_d^{k+1}-i_d^{ref})^2+(i_q^{k+1}-i_q^{ref})^2}$ corresponding to each switch state is calculated based on the d-axis current $i_d^{k+1}$ at the next moment in each switch state, the q-axis current $i_q^{k+1}$ at the next moment in each switch state, the d-axis reference current $i_d^{ref}$, and the q-axis reference current $i_q^{ref}$. Finally, a switch state with a lowest cost function is used as the control policy of the permanent-magnet synchronous machine. It needs to be noted that the inverter shown in FIG. 3 is a two-level inverter. The two-level inverter includes eight switch states, and the eight switch states correspond to seven voltage vectors. Because two of the voltage vectors are the same, the vector diagram shown in FIG. 3 just includes six vectors. The relevant structures of the MTPA and the torque current distribution policy of flux weakening control are structures well known in the art, and therefore, are not described in detail in this application.

In conclusion, based on a model predictive control algorithm, the permanent-magnet synchronous machine control method according to this embodiment of this application predicts the corresponding –axis current and –axis current at the next moment in each switch state based on the –axis current and the –axis current net of the harmonic components at the current moment, and then determines the control policy of the permanent-magnet synchronous machine based on the prediction result. Compared with the existing harmonic current suppression method, the technical solution in this application cancels the existing PI controllers by using the model predictive control algorithm instead, avoids complicated PI parameter adjustment, simplifies the system structure, and is more effective in suppressing the harmonic current.

Figure 4:
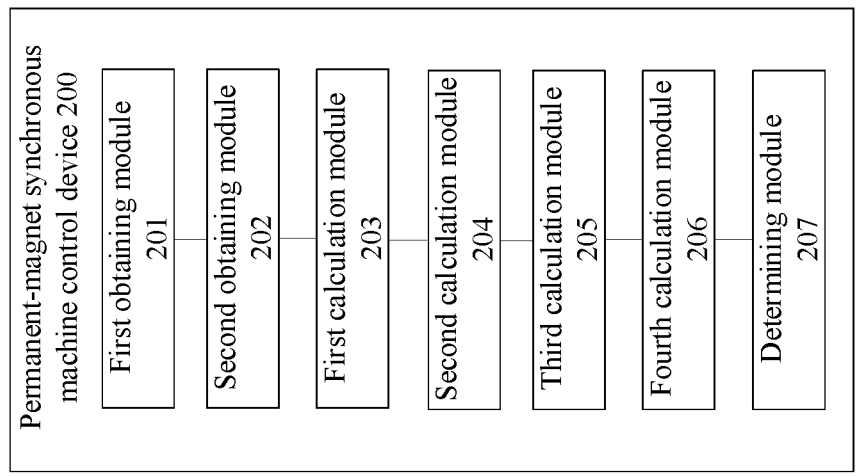
FIG. 4 is a modular block diagram of a permanent-magnet synchronous machine control device according to an embodiment of this application.

Referring to FIG. 4, based on the same inventive conception, an embodiment of this application further provides a permanent-magnet synchronous machine control device 200, including: a first obtaining module 201, a second obtaining module 202, a first calculation module 203, a second calculation module 204, a third calculation module 205, a fourth calculation module 206, and a determining module 207.

The first obtaining module 201 is configured to obtain a d-axis current $i_d$ and a q-axis current $i_q$ in a permanent-magnet synchronous machine control loop at a current moment.

The second obtaining module 202 is configured to obtain a fifth-order harmonic current $i_{d5th}$ and a seventh-order harmonic current $i_{d7th}$ in the d-axis current $i_d$ in the permanent-magnet synchronous machine control loop at the current moment and a fifth-order harmonic current $i_{q5th}$ and a seventh-order harmonic current $i_{q7th}$ in the q-axis current $i_q$ in the permanent-magnet synchronous machine loop at the current moment.

The first calculation module 203 is configured to calculate four harmonic voltages based on the fifth-order harmonic current $i_{d5th}$, the seventh-order harmonic current $i_{d7th}$, the fifth-order harmonic current $i_{q5th}$, and the seventh-order harmonic current $i_{q7th}$, where the four harmonic voltages include a d-axis fifth-order harmonic voltage $u_{d5th}$, a q-axis fifth-order harmonic voltage $u_{q5th}$, a d-axis seventh-order harmonic voltage $u_{d7th}$, and a q-axis seventh-order harmonic voltage $u_{q7th}$.

The second calculation module 204 is configured to subtract the fifth-order harmonic current $i_{d5th}$ and the seventh-order harmonic current $i_{d7th}$ from the d-axis current $i_d$ to obtain a first current $i_d^k$ on a d axis, and subtract the fifth-order harmonic current $i_{q5th}$ and the seventh-order harmonic current $i_{q7th}$ from the q-axis current $i_q$ to obtain a second current $i_q^k$ on a q axis.

The third calculation module 205 is configured to subtract the d-axis fifth-order harmonic voltage $u_{d5th}$ and the d-axis seventh-order harmonic voltage $u_{d7th}$ from a d-axis voltage corresponding to each switch state of the inverter to obtain a first voltage on the d axis in each switch state; and subtract the q-axis fifth-order harmonic voltage $u_{q5th}$ and the q-axis seventh-order harmonic voltage $u_{q7th}$ from a q-axis voltage corresponding to each switch state of the inverter to obtain a second voltage on the q axis in each switch state.

The fourth calculation module 206 is configured to determine a d-axis current $i_d^{k+1}$ at a next moment in each switch state based on the first current $i_d^k$, the second current $i_q^k$, and the first voltage in each switch state; and determine a q-axis current $i_q^{k+1}$ at the next moment in each switch state based on the first current $i_d^k$, the second current $i_q^k$, and the second voltage in each switch state; and The determining module 207 is configured to determine a control policy of the permanent-magnet synchronous machine based on the d-axis current $i_d^{k+1}$ at the next moment in each switch state and the q-axis current $i_q^{k+1}$ at the next moment in each switch state.

In some embodiments, the second obtaining module is specifically configured to obtain a three-phase current in the permanent-magnet synchronous machine control loop at the current moment; transform the three-phase current into a d-axis current and a q-axis current in a fifth-order rotating coordinate system based on a coordinate transformation algorithm and a phase angle of a fifth-order harmonic; filter the d-axis current and the q-axis current in the fifth-order rotating coordinate system by using a filter, so as to obtain the fifth-order harmonic current $i_{d5th}$ and the fifth-order harmonic current $i_{q5th}$; transform the three-phase current into a d-axis current and a q-axis current in a seventh-order rotating coordinate system based on the coordinate transformation algorithm and a phase angle of a seventh-order harmonic; and filter the d-axis current and the q-axis current in the seventh-order rotating coordinate system by using the filter, so as to obtain the seventh-order harmonic current $i_{d7th}$ and the seventh-order harmonic current $i_{q7th}$.

In some embodiments, a formula for calculating the d-axis fifth-order harmonic voltage $u_{d5th}$ is: $u_{d5th}=5w_eL_qi_{q5th}+R_si_{d5th}$; a formula for calculating the q-axis fifth-order harmonic voltage $u_{q5th}$ is: $u_{q5th}=-5w_eL_di_{d5th}+R_si_{q5th}$; a formula for calculating the d-axis seventh-order harmonic voltage $u_{d7th}$ is: $u_{d7th}=-7w_eL_qi_{q7th}+R_si_{d7th}$; and a formula for calculating the q-axis seventh-order harmonic voltage $u_{q7th}$ is: $u_{q7th}=7w_eL_di_{d7th}+R_si_{q7th}$, where, $w_e$ represents an electrical angular velocity, $R_s$ represents a stator resistance, $L_d$ represents a d-axis inductance parameter, and $L_q$ represents a q-axis inductance parameter.

In some embodiments, the determining module is specifically configured to obtain a d-axis reference current $i_d^{ref}$ and a q-axis reference current $i_q^{ref}$ based on an MTPA and a torque current distribution policy of flux weakening control; and calculate a cost function corresponding to each switch state based on the d-axis current $i_d^{k+1}$ at the next moment in each switch state, the q-axis current $i_q^{k+1}$ at the next moment in each switch state, the d-axis reference current $i_d^{ref}$, and the q-axis reference current $i_q^{ref}$. A switch state with a lowest cost function is the control policy of the permanent-magnet synchronous machine.

It needs to be noted that, it can be clearly understood by a person skilled in the art that for ease and brevity of description, a specific working process of the foregoing system, device, and units can be obtained by referring to a corresponding process in the preceding method embodiment, and the details are omitted here.

Based on the same inventive conception, an embodiment of this application further provides a computer-readable storage medium on which a computer program is stored. When executed, the computer program performs the method provided in the foregoing embodiment.

The storage medium may be any available medium accessible to a computer, or a data storage device such as a server or data center that integrates one or more available media. The available media may be a magnetic medium (such as a floppy disk, a hard disk, or a magnetic tape), an optical medium (such as a DVD), or a semiconductor medium (such as a solid state disk (SSD)).

In the embodiments provided in this application, it is understandable that the disclosed device and method may be implemented by other means. The device embodiment described above is merely exemplary. For example, the unit division is merely division with respect to logical functions, and in actual implementations, the units may be divided in other manners. For another example, a plurality of units or components may be combined or integrated into another system, or some features may be ignored or not implemented. In addition, the displayed or discussed mutual couplings or direct couplings or communications connections may be implemented through some communications interfaces. The indirect couplings or communications connections between the devices or units may be implemented in electronic, mechanical or other forms.

In addition, the units described as discrete components above may be separated physically or not; and the components illustrated as units may be physical units or not, that is, they may be located in one place or distributed on a plurality of network elements. Some or all of the units may be selected according to actual needs to achieve the objectives of the solutions of the embodiments.

In addition, function modules in each embodiment of this application may be integrated together to form a stand-alone part, or each module may exist alone, or two or more modules may be integrated into a stand-alone part.

The relational terms herein such as first and second are used merely to differentiate one entity or operation from another, and do not necessarily require or imply any actual relationship or sequence between the entities or operations.

What is described above is merely embodiments of this application, but not intended to limit the protection scope of this application. To a person skilled in the art, various modifications and variations may be made to this application. Any modifications, equivalent replacements, improvements, and the like made without departing from the spirit and principles of this application fall within the protection scope of this application.

What is claimed is:

1. A permanent-magnet synchronous machine control method, comprising:
    obtaining a d-axis current $i_d$ and a q-axis current $i_q$ in a permanent-magnet synchronous machine control loop at a current moment;
    obtaining a fifth-order harmonic current $i_{d5th}$ and a seventh-order harmonic current $i_{d7th}$ in the d-axis current $i_d$ in the permanent-magnet synchronous machine control loop at the current moment, and a fifth-order harmonic current $i_{q5th}$ and a seventh-order harmonic current $i_{q7th}$ in the q-axis current $i_q$ in the permanent-magnet synchronous machine loop at the current moment;
    calculating four harmonic voltages based on the fifth-order harmonic current $i_{d5th}$, the seventh-order harmonic current $i_{d7th}$, the fifth-order harmonic current $i_{q5th}$, and the seventh-order harmonic current $i_{q7th}$, wherein the four harmonic voltages comprise a d-axis-fifth-order harmonic voltage $u_{d5th}$, a q-axis fifth-order harmonic voltage $u_{q5th}$, a d-axis seventh-order harmonic voltage $u_{d7th}$, and a q-axis seventh-order harmonic voltage $u_{q7th}$;
    subtracting the fifth-order harmonic current $i_{d5th}$ and the seventh-order harmonic current $i_{d7th}$ from the d-axis current $i_d$ to obtain a first current $i_d^k$ on a d axis; and subtracting the fifth-order harmonic current $i_{q5th}$ and the seventh-order harmonic current $i_{q7th}$ from the q-axis current $i_q$ to obtain a second current $i_q^k$ on a q axis;
    subtracting the d-axis fifth-order harmonic voltage $u_{d5th}$ and the d-axis seventh-order harmonic voltage $u_{d7th}$ from a d-axis voltage corresponding to each switch state of an inverter to obtain a first voltage on the d axis in each switch state, and subtracting the q-axis fifth-order harmonic voltage $u_{q5th}$ and the q-axis seventh-order harmonic voltage $u_{q7th}$ from a q-axis voltage corresponding to each switch state of the inverter to obtain a second voltage on the q axis in each switch state;
    determining a d-axis current $i_d^{k+1}$ at a next moment in each switch state based on the first current $i_d^k$, the second current $i_q^k$, and the first voltage in each switch state; and determining a q-axis current $i_q^{k+1}$ at the next moment in each switch state based on the first current $i_d^k$, the second current $i_q^k$, and the second voltage in each switch state; and determining a control policy of the permanent-magnet synchronous machine based on the d-axis current $i_d^{k+1}$ at the next moment in each switch state and the q-axis current $i_q^{k+1}$ at the next moment in each switch state.

2. The method according to claim 1, wherein the obtaining a fifth-order harmonic current $i_{d5th}$ and a seventh-order harmonic current $i_{d7th}$ in the d-axis current $i_d$ in the permanent-magnet synchronous machine control loop at the current moment, and a fifth-order harmonic current $i_{q5th}$ and a seventh-order harmonic current $i_{q7th}$ in the q-axis current $i_q$ in the permanent-magnet synchronous machine loop at the current moment comprises:

obtaining a three-phase current in the permanent-magnet synchronous machine control loop at the current moment;

transforming the three-phase current into a d-axis current and a q-axis current in a fifth-order rotating coordinate system based on a coordinate transformation algorithm and a phase angle of a fifth-order harmonic;

filtering the d-axis current and the q-axis current in the fifth-order rotating coordinate system by using a filter, so as to obtain the fifth-order harmonic current $i_{d5th}$ and the fifth-order harmonic current $i_{q5th}$;

transforming the three-phase current into a d-axis current and a q-axis current in a seventh-order rotating coordinate system based on the coordinate transformation algorithm and a phase angle of a seventh-order harmonic; and filtering the d-axis current and the q-axis current in the seventh-order rotating coordinate system by using the filter, so as to obtain the seventh-order harmonic current $i_{d7th}$ and the seventh-order harmonic current $i_{q7th}$.

3. The method according to claim 1, wherein a formula for calculating the d-axis fifth-order harmonic voltage $u_{d5th}$ is:
$u_{d5th} = 5w_e L_q i_{q5th} + R_s i_{d5th}$;

a formula for calculating the q-axis fifth-order harmonic voltage is:
$u_{q5th} = -5w_e L_d i_{d5th} + R_s i_{q5th}$;

a formula for calculating the d-axis seventh-order harmonic voltage is:
$u_{d7th} = -7w_e L_q i_{q7th} + R_s i_{d7th}$; and a formula for calculating the q-axis seventh-order harmonic voltage is:
$u_{q7th} = 7w_e L_d i_{d7th} + R_s i_{q7th}$, wherein, $w_e$ represents an electrical angular velocity, $R_s$ represents a stator resistance, $L_d$ represents a d-axis inductance parameter, and $L_q$ represents a q-axis inductance parameter.

4. The method according to claim 1, wherein the determining a control policy of the permanent-magnet synchronous machine based on the d-axis current $i_d^{k+1}$ at the next moment in each switch state and the q-axis current $i_q^{k+1}$ at the next moment in each switch state comprises:

obtaining a d-axis reference current $i_d^{ref}$ and a q-axis reference current $i_q^{ref}$ based on an MTPA and a torque current distribution policy of flux weakening control; and calculating a cost function corresponding to each switch state based on the d-axis current $i_d^{k+1}$ at the next moment in each switch state, the q-axis current $i_q^{k+1}$ at the next moment in each switch state, the d-axis reference current $i_d^{ref}$, and the q-axis reference current $i_q^{ref}$, wherein, a switch state with a lowest cost function is the control policy of the permanent-magnet synchronous machine.

5. The method according to claim 1, wherein the inverter is a two-level inverter, and the two-level inverter comprises eight switch states.

6. A permanent-magnet synchronous machine control device, characterized in that the device comprises:

a first obtaining module, configured to obtain a d-axis current $i_d$ and a q-axis current $i_q$ in a permanent-magnet synchronous machine control loop at a current moment;

a second obtaining module, configured to obtain a fifth-order harmonic current $i_{d5th}$ and a seventh-order harmonic current $i_{d7th}$ in the d-axis current $i_d$ in the permanent-magnet synchronous machine control loop at the current moment, and a fifth-order harmonic current $i_{q5th}$ and a seventh-order harmonic current $i_{q7th}$ in the q-axis current in the permanent-magnet synchronous machine loop at the current moment;

a first calculation module, configured to calculate four harmonic voltages based on the fifth-order harmonic current $i_{d5th}$, the seventh-order harmonic current $i_{d7th}$, the fifth-order harmonic current $i_{q5th}$, and the seventh-order harmonic current $i_{q7th}$, wherein the four harmonic voltages comprise a d-axis fifth-order harmonic voltage $u_{d5th}$, a q-axis fifth-order harmonic voltage $u_{q5th}$, a d-axis seventh-order harmonic voltage $u_{d7th}$, and a q-axis seventh-order harmonic voltage $u_{q7th}$;

a second calculation module, configured to subtract the fifth-order harmonic current $i_{d5th}$ and the seventh-order harmonic current $i_{d7th}$ from the d-axis current $i_d$ to obtain a first current $i_d^k$ on a d axis; and subtract the fifth-order harmonic current $i_{q5th}$ and the seventh-order harmonic current $i_{q7th}$ from the q-axis current $i_q$ to obtain a second current $i_q^k$ on a q axis;

a third calculation module, configured to subtract the d-axis fifth-order harmonic voltage $u_{d5th}$ and the d-axis seventh-order harmonic voltage $u_{d7th}$ from a d-axis voltage corresponding to each switch state of an inverter to obtain a first voltage on the d axis in each switch state; and subtract the q-axis fifth-order harmonic voltage $u_{q5th}$ and the q-axis seventh-order harmonic voltage $u_{q7th}$ from a q-axis voltage corresponding to each switch state of the inverter to obtain a second voltage on the q axis in each switch state;

a fourth calculation module, configured to determine a d-axis current $i_d^{k+1}$ at a next moment in each switch state based on the first current $i_d^k$, the second current $i_q^k$, and the first voltage in each switch state; and determine a q-axis current $i_q^{k+1}$ at the next moment in each switch state based on the first current $i_d^k$, the second current $i_q^k$, and the second voltage in each switch state; and a determining module, configured to determine a control policy of the permanent-magnet synchronous machine based on the d-axis current $i_d^{k+1}$ at the next moment in each switch state and the q-axis current $i_q^{k+1}$ at the next moment in each switch state.

7. The device according to claim 6, wherein the second obtaining module is specifically configured to obtain a three-phase current in the permanent-magnet synchronous machine control loop at the current moment; transform the three-phase current into a d-axis current and a q-axis current in a fifth-order rotating coordinate system based on a coordinate transformation algorithm and a phase angle of a fifth-order harmonic; filter the d-axis current and the q-axis current in the fifth-order rotating coordinate system by using a filter, so as to obtain the fifth-order harmonic current $i_{d5th}$ and the fifth-order harmonic current $i_{q5th}$; transform the three-phase current into a d-axis current and a d-axis current in a seventh-order rotating coordinate system based on the coordinate transformation algorithm and a phase angle of a seventh-order harmonic; and filter the d-axis current and the q-axis current in the seventh-order rotating coordinate system by using the filter, so as to obtain the seventh-order harmonic current $i_{d7th}$ and the seventh-order harmonic current $i_{q7th}$.

8. The device according to claim 6, wherein a formula for calculating the d-axis fifth-order harmonic voltage $u_{d5th}$ is: $u_{d5th}=5w_e L_q i_{q5th}+R_s i_{d5th}$;

a formula for calculating the q-axis fifth-order harmonic voltage $u_{q5th}$ is:

$u_{q5th}=-5w_e L_d i_{d5th}+R_s i_{q5th}$;

a formula for calculating the d-axis seventh-order harmonic voltage $u_{d7th}$ is:

$u_{d7th}=-7w_e L_q i_{q7th}+R_s i_{d7th}$; and a formula for calculating the q-axis seventh-order harmonic voltage $u_{q7th}$ is:

$u_{q7th}=7w_e L_d i_{d7th}+R_s i_{q7th}$, wherein, $w_e$ represents an electrical angular velocity, $R_s$ represents a stator resistance, $L_d$ represents a d-axis inductance parameter, and $L_q$ represents a q-axis inductance parameter.

9. The device according to claim 6, wherein the determining module is specifically configured to obtain a d-axis reference current $i_d^{ref}$ and a q-axis reference current $i_q^{ref}$ based on an MTPA and a torque current distribution policy of flux weakening control; and calculate a cost function corresponding to each switch state based on the d-axis current $i_d^{k+1}$ at a next moment in each switch state, the q-axis current $i_q^{k+1}$ at the next moment in each switch state, the d-axis reference current $i_d^{ref}$, and the q-axis reference current $i_q^{ref}$, wherein, a switch state with a lowest cost function is the control policy of the permanent-magnet synchronous machine.

10. A permanent-magnet synchronous machine control system, comprising: an electric machine controller, a permanent-magnet synchronous machine, and an inverter, wherein the electric machine controller is connected to the permanent-magnet synchronous machine and the inverter separately;

the permanent-magnet synchronous machine is further connected to the inverter; and the electric machine controller is configured to perform the method according to claim 1.

* * * * *